US008342769B2

(12) United States Patent
Elterman et al.

(10) Patent No.: US 8,342,769 B2
(45) Date of Patent: Jan. 1, 2013

(54) PIVOT SOCKET WITH CARTRIDGE BEARING AND VEHICLE STEERING LINKAGE THEREWITH

(76) Inventors: James J. Elterman, St. Louis, MO (US); George R. Schmidt, St. Louis, MO (US)

( * ) Notice: Subject to any disclaimer, the term of this patent is extended or adjusted under 35 U.S.C. 154(b) by 268 days.

(21) Appl. No.: 12/371,051

(22) Filed: Feb. 13, 2009

(65) Prior Publication Data
US 2010/0207340 A1    Aug. 19, 2010

(51) Int. Cl.
*F16D 1/12* (2006.01)
(52) U.S. Cl. .......................... 403/147; 403/136
(58) Field of Classification Search .................. 403/119, 403/131, 132, 135, 136, 138, 141, 143, 144–147, 403/149; 280/93.508–93.509
See application file for complete search history.

(56) References Cited

U.S. PATENT DOCUMENTS

| | | | |
|---|---|---|---|
| 2,695,185 A | 11/1954 | Latzen | |
| 3,008,743 A * | 11/1961 | Westercamp | 403/141 |
| 3,044,798 A * | 7/1962 | Gerner | 280/93.509 |
| 3,245,706 A * | 4/1966 | Rowlett | 403/135 |
| 3,329,453 A * | 7/1967 | Patton | 403/221 |
| 3,667,789 A * | 6/1972 | McNeely et al | 403/128 |
| 3,945,737 A * | 3/1976 | Herbenar | 403/27 |
| 3,951,557 A | 4/1976 | Herbenar | |
| 4,017,197 A | 4/1977 | Farrant | |
| 4,101,227 A | 7/1978 | Herbenar et al. | |
| 5,028,163 A * | 7/1991 | Krieg et al. | 403/131 |
| 5,066,160 A * | 11/1991 | Wood | 403/140 |
| 6,146,045 A * | 11/2000 | Maughan | 403/165 |
| 6,371,682 B1 * | 4/2002 | Maughan | 403/165 |
| 6,676,325 B2 * | 1/2004 | Schmidt et al. | 403/120 |
| 7,344,311 B2 * | 3/2008 | Lu et al. | 384/206 |
| 2002/0012567 A1 | 1/2002 | Schmidt | |
| 2005/0220531 A1 | 10/2005 | Sellers et al. | |
| 2006/0022420 A1 | 2/2006 | Pressler et al. | |
| 2006/0097470 A1 | 5/2006 | Chmelar | |

\* cited by examiner

*Primary Examiner* — Joshua Kennedy
(74) *Attorney, Agent, or Firm* — Robert L. Stearns; Dickinson Wright, PLLC

(57) ABSTRACT

A pivot socket includes a housing with an inner surface providing a cavity extending between a substantially closed end and an open end. A cartridge bearing is received in the cavity with a spring disposed between the closed end and the cartridge bearing. The cartridge bearing has an inner surface with a cylindrical portion and conical portion converging inwardly from the cylindrical portion. The cylindrical portion houses a tapered bearing for relative axial movement therewith. A stud having opposite first and second tapered surfaces diverging away from one another is received in the cartridge bearing, with the first tapered surface engaging the tapered bearing for relative sliding movement therewith and the second tapered surface engaging the conical portion of the cartridge bearing for relative sliding movement therewith, thereby causing the relative axial movement between the tapered bearing and the cartridge bearing.

12 Claims, 2 Drawing Sheets

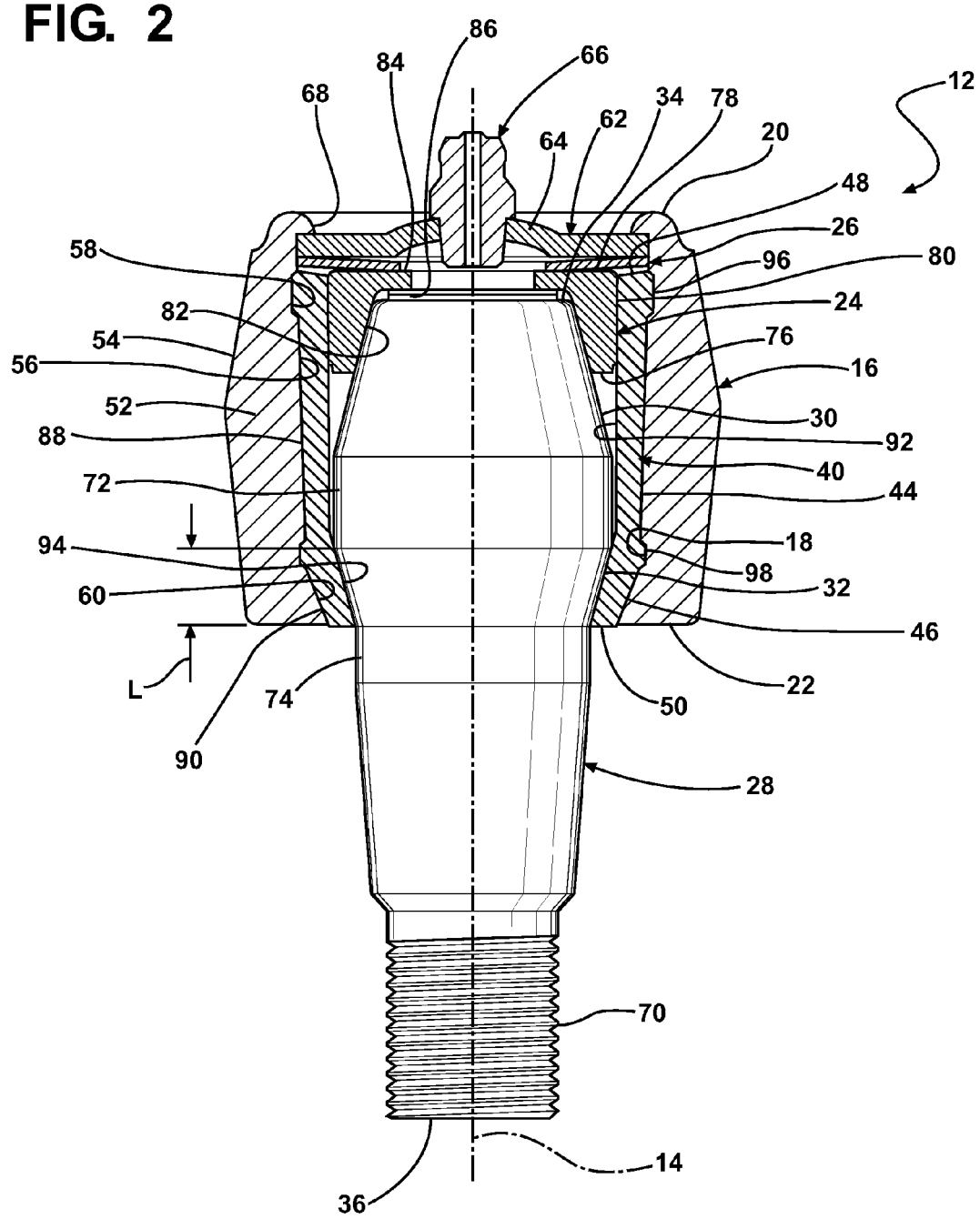

US 8,342,769 B2

PIVOT SOCKET WITH CARTRIDGE BEARING AND VEHICLE STEERING LINKAGE THEREWITH

BACKGROUND OF THE INVENTION

1. Technical Field

This invention relates generally to pivot sockets for linking relatively movable components to one another, and more particularly to pivot sockets for linking relatively movable vehicle steering components to one another.

2. Related Art

Vehicle steering systems typically include pivot sockets for coupling components to one another. Upon coupling the steering components together, it is desirable that the socket allow for a limited, predetermined amount of angular deflection between the components to prevent binding their freedom of intended movement, while also allowing for relative rotation between the components. In order for the steering system of the vehicle to sustain an optimal level of performance over its intended useful life, it is desirable that the preload within the socket and the range of permissible angular deflection across the socket remain substantially constant. Otherwise, if the permissible angular movement of the socket increases over time, the user typically perceives the steering system as requiring service. Further, it is desirable that the sockets be constructed having a consistent feel and performance from one socket to another to provide vehicles having the socket with the same steering performance and useful life. In order to provide the sockets with the desired consistent feel, performance and useful life, it is necessary to manufacture the individual components of the sockets within a specified tolerance limit, and although this is presently possible, it comes at a cost via high manufacturing process costs, such as grinding and polishing bearing surfaces, for example. Accordingly, there are continual efforts being made to manufacture pivot sockets in an economical manner, while at the same time, attempting to maintain desired consistency from one part to another, performance and useful life for the sockets.

SUMMARY OF THE INVENTION

A pivot socket includes a housing with a wall having an inner surface providing a cavity extending between a substantially closed end and an open end. The socket further includes a tapered bearing and a spring disposed between the tapered bearing and the closed end of the socket. Additionally, the socket includes a stud having opposite first and second tapered surfaces diverging away from one another generally toward opposite ends of the stud, with the first tapered surface engaging the tapered bearing for relative sliding movement therewith. Further yet, the socket includes a cartridge bearing received in the cavity of the housing. The cartridge bearing has a substantially cylindrical portion and tapered portion extending inwardly from the substantially cylindrical portion. The substantially cylindrical portion extends to one end of the cartridge bearing and houses the tapered bearing for relative sliding movement with the tapered bearing. The tapered portion extends to another end of the cartridge bearing and engages the second tapered surface of the stud for relative sliding movement with the second tapered surface.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 2 is an assembled cross-sectional view of the pivot socket of FIG. 1.

DETAILED DESCRIPTION OF PRESENTLY PREFERRED EMBODIMENTS

Figure 1A:
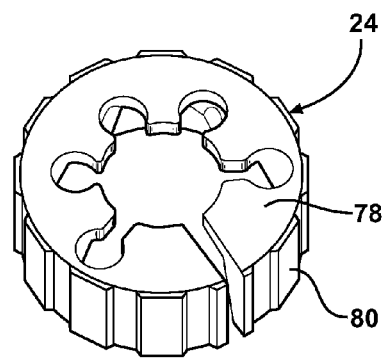
FIG. 1A is a perspective view of tapered bearing of the pivot socket.
Figure 1:
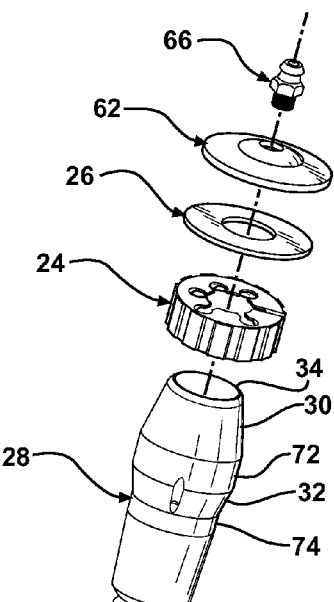
FIG. 1 is an exploded perspective view of a vehicle steering linkage component having a pivot socket constructed in accordance with one presently preferred aspect of the invention.
Figure 1:
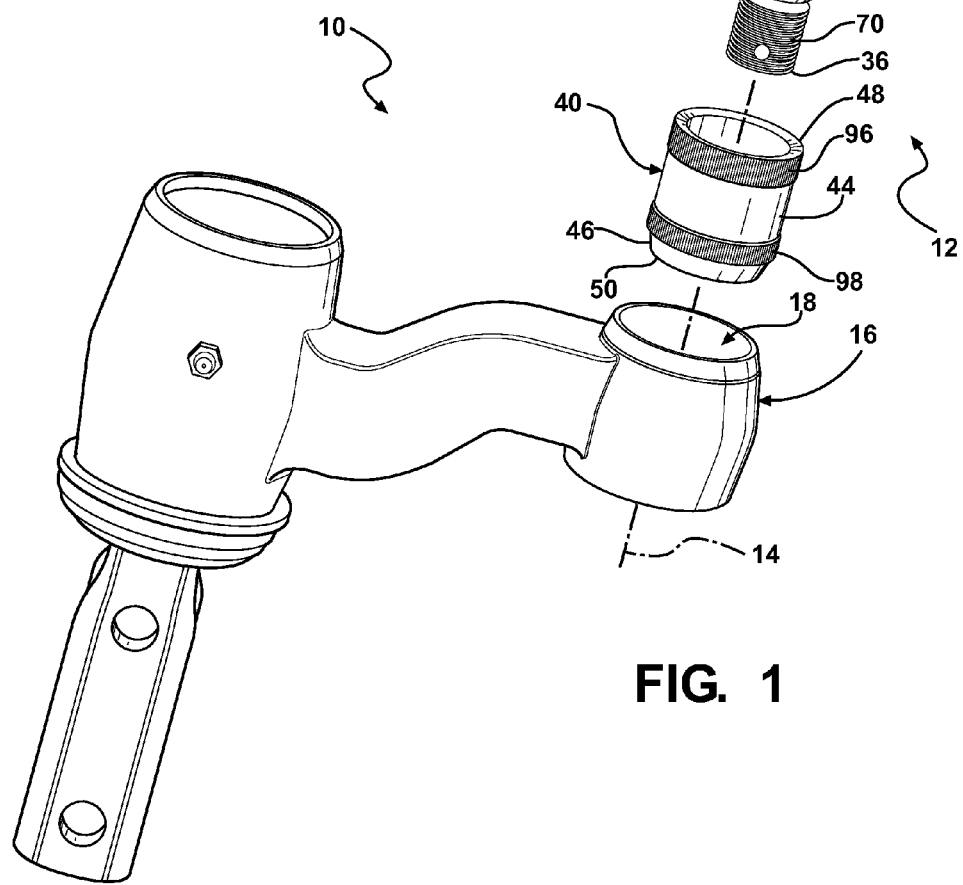

Referring in more detail to the drawings, FIG. 1 illustrates a steering linkage component, by way of example and without limitation, an idler arm 10, having a semi-compliant pivot socket, referred to hereafter as socket 12, constructed in accordance with one presently preferred embodiment of the invention. The socket 12 is preferably constructed of metal components, thereby enhancing the ability to maintain dimensional stability from one part to another, while at the same time, enhancing the performance of the socket 12 over its useful life. The socket 12 allows rotation between the coupled, interlinked components and also a desired, limited amount of angular deflection relative to a longitudinal axis 14 of the socket 12. The limited amount of angular deflection is maintained constant or substantially constant over the useful life of the socket 12 due to its novel construction, wherein the angular deflection is provided by a predetermined, limited amount of axial deflection of components within the socket 12.

As best illustrated in FIG. 2, the socket 12 has a housing 16 that provides a cavity 18 extending between a substantially closed end 20 and an open end 22. A split tapered bearing 24 (FIG. 1A) is disposed in the cavity 18, with a spring, represented here as a Bellville washer 26, being disposed between and abutting the tapered bearing 24 and the closed end 22. A stud 28 having opposite first and second tapered surfaces 30, 32 diverging away from one another generally toward respective opposite ends 34, 36 of the stud 28 is disposed in part in the cavity 18 with the first tapered surface 30 engaging the tapered bearing 24 for relative sliding movement therewith. A cartridge bearing 40 is also disposed in the cavity 18. The cartridge bearing 40 has a substantially cylindrical portion 44 and tapered portion 46 extending radially inwardly from the cylindrical portion 44. The substantially cylindrical portion 44 extends to one end 48 of the cartridge bearing 40 and houses the tapered bearing 24 for relative sliding movement with the tapered bearing 24. The tapered portion 46 extends to another end 50 of the cartridge bearing 40 and engages the second tapered surface 32 of the stud 28 for relative sliding movement with the second tapered surface 32. In use, aside from the stud 28 being able to rotate about the longitudinal axis 14, the stud is able to pivot over a predetermined, limited range of angular deflection relative to the longitudinal axis 14. The pivoting motion is provided via the permissible relative sliding movement between the tapered bearing 24 and the first tapered surface 30 of the stud 28, between the tapered bearing 24 and the substantially cylindrical portion 44 of the cartridge bearing 40, and between the second tapered surface 32 of the stud 28 and the tapered portion 46 of the cartridge bearing 40. The limited angular deflection of the stud 28 relative to the housing 16 causes controlled radial expansion and axial movement of the split tapered bearing 24 toward the closed end 20 of the housing 16, with the amount of axial movement being limited by the amount of permissible axial deflection of the Belleville washer 26. As such, the amount of total angular deflection of the stud 28 can be tightly controlled, regulated and maintained over the life of the pivot socket 12.

The housing 16 has a wall 52 with an outer surface 54 extending between the closed end 20 and the open end 22 and an inner surface 56 providing the cavity 18. The outer surface 54 is configured for attachment to a suspension member, such as a tie rod (not shown), wherein the socket 12 is used as part of an assembly which includes 2 pivot sockets. The stud 28 of one pivot socket 12 is attached to a centerlink and the opposite socket 12 is attached to a frame rail. The inner surface 56 has a substantially straight cylindrical inner surface portion 58 adjacent the closed end 20 and a tapered inner surface portion 60 adjacent open end 22. The cylindrical inner surface portion 58 is configured to abut the substantially cylindrical portion 44 of the cartridge bearing 40 and the tapered inner surface portion 60 is configured to engage the tapered portion 46 of the cartridge bearing 40. Since the inner surface 56 of the housing 16 does not act as a bearing surface, it can remain relatively rough, such as "as cast" without concern for being ground or otherwise honed, and thus, can remain as manufactured without performing secondary operations. The tapered inner surface portion 60 is preferably formed as a single piece of material with the housing 16, although it is contemplated that it could be formed separately and then attached to the housing 16, and it is formed to extend flush with the open end 22. The substantially cylindrical portion 58 extends from the tapered inner surface portion 60 to the closed end 20, wherein the closed end 20 is illustrated here as being provided by an end cap 62. The end cap 62 is represented here as being dome-shaped with a concave surface 64 facing the cavity 18. The end cap 62 is preferably provided with a lubrication fitting 66 passing through the dome-shaped portion to facilitate lubricating the socket 12 over the course of its useful life. It should be recognized that any suitable mechanism can be used to attach the end cap 62 to the housing 16, including snap rings (not shown), however, it is believed most economical to spin-curl an annular end lip 68 of the housing 16 radially inwardly to provide an axial barrier to the end cap 62, thereby avoiding the need for additional components.

The stud 28 has an elongate body extending between its opposite ends 34, 36. One of the ends 36 has an external threaded portion 70 for attachment to one of the suspension members, such as a center link (not shown). The first tapered surface 30 extends from the other end 34 and diverges radially outwardly toward a cylindrical bearing surface 72. The cylindrical bearing surface 72 is sized for a close clearance fit within the cartridge bearing 40. The second tapered surface 32 converges radially inwardly away from the cylindrical bearing surface 72 to a generally cylindrical shaft portion 74.

The split tapered bearing 24 has a pair of opposite, generally planar end faces 76, 78 with a straight or substantially straight cylindrical outer bearing surface 80 extending between the end faces 76, 78. The outer bearing surface 80 is sized for a close clearance fit within the cartridge bearing 40 to allow relative axial sliding between the bearing 24 and the cartridge bearing 40. The outer bearing surface 80 can be provided with a smooth surface finish, such as in a grinding or polishing process, to facilitate smooth relative sliding with the cartridge bearing 40. A tapered bearing surface 82 converges radially inwardly from one end face 76 and extends toward the other end face 78 to a radially inwardly extending thrust flange 84. One side of the thrust flange 84 forms a radially inwardly extending portion of the end face 78 against which the Belleville washer 26 abuts to apply a bias force thereagainst, while a clearance gap 86 is preferably provided between the other side of the thrust flange 84 and the stud end 34.

The Bellville washer 26 can be fabricated of any suitable spring material and provided having any suitable outer diameter corresponding with the inner surface 56 of the housing 16. In addition, the Bellville washer 26 can have any suitable axial thickness in relaxed and compressed conditions, thereby being able to impart a precise and narrow range of applied axial force in use, depending on the physical characteristics of the selected Bellville washer. Bellville washers have a relative small range of axial compression, and thus, allow for the imparted axial force, which is a function of axial distance compressed, to be tightly controlled. By way of example and without limitation, one Belleville washer 26 could be provided having a relaxed, uncompressed height of about 0.075", a compressed height of about 0.035", and a spring thickness of about 0.030", thereby providing a range of about 0.004" axial movement allowed by the Belleville washer 26. Accordingly, the limited range axial movement provides a tightly controlled and limited range of potential angular deflection of the stud 28. In addition, the magnitude of axial force imparted by the Belleville washer 26 has a relatively narrow range of applied force variance, thereby providing the socket 12 with a substantially constant feel and performance. Stated another way, the force required to pivot the stud 20 is substantially constant given the narrow range of axial force imparted on the bearing assembly 22 by the spring member 26.

The cartridge bearing 40 is received in the cavity 18 of the housing 16 and fixed or substantially fixed therein against relative axial movement. The cylindrical or substantially cylindrical portion 44 has a cylindrical outer surface 88 sized for a close fit in abutment with the cylindrical inner surface portion 58 of the housing 16 and the tapered portion 46 has a tapered outer surface 90 extending along a common angle of inclination as the tapered inner surface portion 60 of the housing 16 so that the tapered outer surface 90 and the tapered inner surface portion 60 of the housing 16 abut one another across their full length. One end 50 of the cartridge bearing 40 remains substantially flush with the end 22 of the housing and the other end 48 of the cartridge preferably remains spaced from the Belleville washer 26 by an annular gap. Accordingly, the Belleville washer 26 contacts the end cap 62 along its annular outer periphery, while remaining spaced from the cartridge bearing 40, and further, the Belleville washer 26 contacts the tapered bearing 24 along at its annular inner periphery.

The cylindrical or substantially cylindrical portion 44 of the cartridge bearing 40 has a cylindrical inner bearing surface 92 sized for a close, clearance fit with the cylindrical bearing surface 72 of the shaft 16, thereby allowing relative axial sliding movement between the stud 28 and the cartridge bearing 40. The tapered portion 46 has a tapered inner bearing surface 94 extending along a common angle of inclination as the second tapered surface 32 of the stud 28 so that the tapered inner bearing surface 94 of the cartridge bearing 40 and the second tapered surface 32 of the stud 28 abut one another across the full length (L) of their full abutting surfaces for relative sliding angular movement. The abutting tapered surfaces 94, 32 extend flush from the end 22 of the housing 16 axially inwardly therefrom, thereby orienting the confronting bearing surfaces 94, 32 at the furthest location possible from the opposite confronting bearing surfaces 82, 30. By increasing the distance between the respective bearing surfaces 92, 32 and 82, 30, the socket 12 has an enhanced and maximized resistance to radial loading, and thus, the socket 12 can achieve the same torque resistance in a smaller envelope.

In use, the steering component attached to the pivot socket 12, such as the idler arm 10 and the center link (not shown) are able to freely pivot relative to one another via rotation or oscillation of the stud 28 about the longitudinal axis 14 within the cartridge bearing 40. The rotation or oscillation is facilitated by the controlled clearances maintained between the smooth abutting bearing surfaces of the tapered bearing 24 and the stud 28, i.e. the tapered bearing surface 82 and the first tapered surface 30, and also between the smooth abutting bearing surfaces of the cartridge bearing 40 and the stud 28, i.e. the tapered inner bearing surface 94 and the second tapered surface 32, and also the cylindrical inner bearing surface 92 and the cylindrical bearing surface 72. In addition, a controlled and limited amount of angular deflection of the stud 28 relative to the housing 16 is provided by the socket 12 without causing binding between the coupled vehicle steering components. The limited angular deflection results when a force is applied to the stud 28 generally perpendicular to the longitudinal axis 14. The applied lateral force causes the tapered bearing surface 82 of the split tapered bearing 24 and the first tapered surface 30 of the stud 28 to slide relative to one another and also the tapered inner bearing surface 94 of the cartridge bearing 40 and the second tapered surface 32 of the stud 28 to slide relative to one another. This relative sliding movement between the tapered surfaces causes a slight axial translation of the stud 28 along the axis 14 within the cartridge bearing 40. The total amount of axial translation is limited by the amount of permissible axial compression of the Belleville washer 26, which as mentioned, is generally about 0.004". Accordingly, the total amount of permissible angular deflection of the stud 28 relative to the housing 16 is very limited, although enough to prevent binding of the vehicle steering components in use.

With the aforementioned pivot socket components all being fabricated from metal, the socket is assured of being robust. Further, the dimension stability of the components, both in manufacture and in use, is able to be maintained, as the components are highly wear resistant, unlike plastic counterparts. In addition, with the incorporation of the cartridge bearing 40, the manufacturing requirements for the housing 16 are less stringent. This is so because there are no requirements for high precision, such as typically used to provide smooth bearing surfaces in the housing 16, as the bearing surfaces are now provided by the cartridge bearing 40. In addition, the cartridge bearing 40 can be manufactured with a powder metal material, thereby allowing the finished shape of the cartridge bearing 40 to be formed generally without costly secondary machining operations, e.g. turning or grinding, which in turn reduces the amount of material waste. Further, by forming the cartridge bearing 40 in a powder metal process, various features can be provided, such as knurling, shown here by way of example, as an upper knurled portion 96 adjacent the end 48 and a lower knurled portion 98 proximate the opposite end 50. The knurled portions 96, 98 facilitate fixing the cartridge bearing 40 in the housing 16, and also allow the tolerances of the cartridge bearing outer surface 88 and the housing inner surface 56 to be further relaxed in manufacture.

Obviously, many modifications and variations of the present invention are possible in light of the above teachings. It is, therefore, to be understood that within the scope of the appended claims, the invention may be practiced otherwise than as specifically described.

What is claimed is:

1. A pivot socket, comprising:
a housing having a wall with an inner surface providing a cavity extending between a substantially closed end and an open end and a tapered inner surface adjacent the open end;
a tapered bearing;
a spring disposed between said tapered bearing and said closed end;
a stud having opposite first and second tapered surfaces diverging away from one another generally toward opposite ends of said stud, said first tapered surface engaging said tapered bearing for relative sliding movement therewith to control angular deflection of said stud relative to said housing;
a cartridge bearing received in said cavity of said housing, said cartridge bearing having a substantially cylindrical portion and tapered portion extending inwardly from said substantially cylindrical portion, said substantially cylindrical portion extending to one end surface of said cartridge bearing and housing said tapered bearing for relative sliding movement with said tapered bearing, said tapered portion having a generally flat tapered inner surface and a generally flat tapered outer surface, said tapered inner surface extending to another end surface of said cartridge bearing and engaging said second tapered surface of said stud for relative sliding movement with said second tapered surface to control angular deflection of said stud relative to said housing and said tapered outer surface extending along a common angle of inclination as the tapered inner surface portion of the housing so that the tapered outer surface and the tapered inner surface portion of the housing abut one another substantially across their full length.

2. The pivot socket of claim 1 wherein said spring is disposed adjacent to one end of said cartridge bearing.

3. The pivot socket of claim 2 wherein said spring abuts said closed end.

4. The pivot socket of claim 3 wherein said spring is a Belleville washer.

5. The pivot socket of claim 4 wherein said Belleville washer provides said tapered bearing with a maximum axial movement relative to said housing of about 0.004".

6. The pivot socket of claim 1 wherein said tapered portion extends substantially flush with said open end of said housing.

7. The pivot socket of claim 1 wherein said inner surface of said housing has a substantially cylindrical surface adjacent said closed end, said substantially cylindrical surface abutting said substantially cylindrical portion of said cartridge bearing.

8. The pivot socket of claim 7 wherein said tapered surface is formed as a single piece of material with said housing.

9. The pivot socket of claim 7 wherein said tapered surface confronts said tapered portion of said cartridge bearing to prevent said cartridge bearing from moving axially out of said cavity through said open end of said housing.

10. The pivot socket of claim 1 wherein said tapered bearing has a cylindrical outer bearing surface abutting said substantially cylindrical portion of said cartridge bearing for sliding movement therewith.

11. The pivot socket of claim 1 wherein said inner surface is as cast.

12. The pivot socket of claim 1 wherein said housing and said tapered bearing and said spring and said stud and said cartridge bearing are all of metal.

* * * * *